United States Patent Office 3,101,612
Patented Aug. 27, 1963

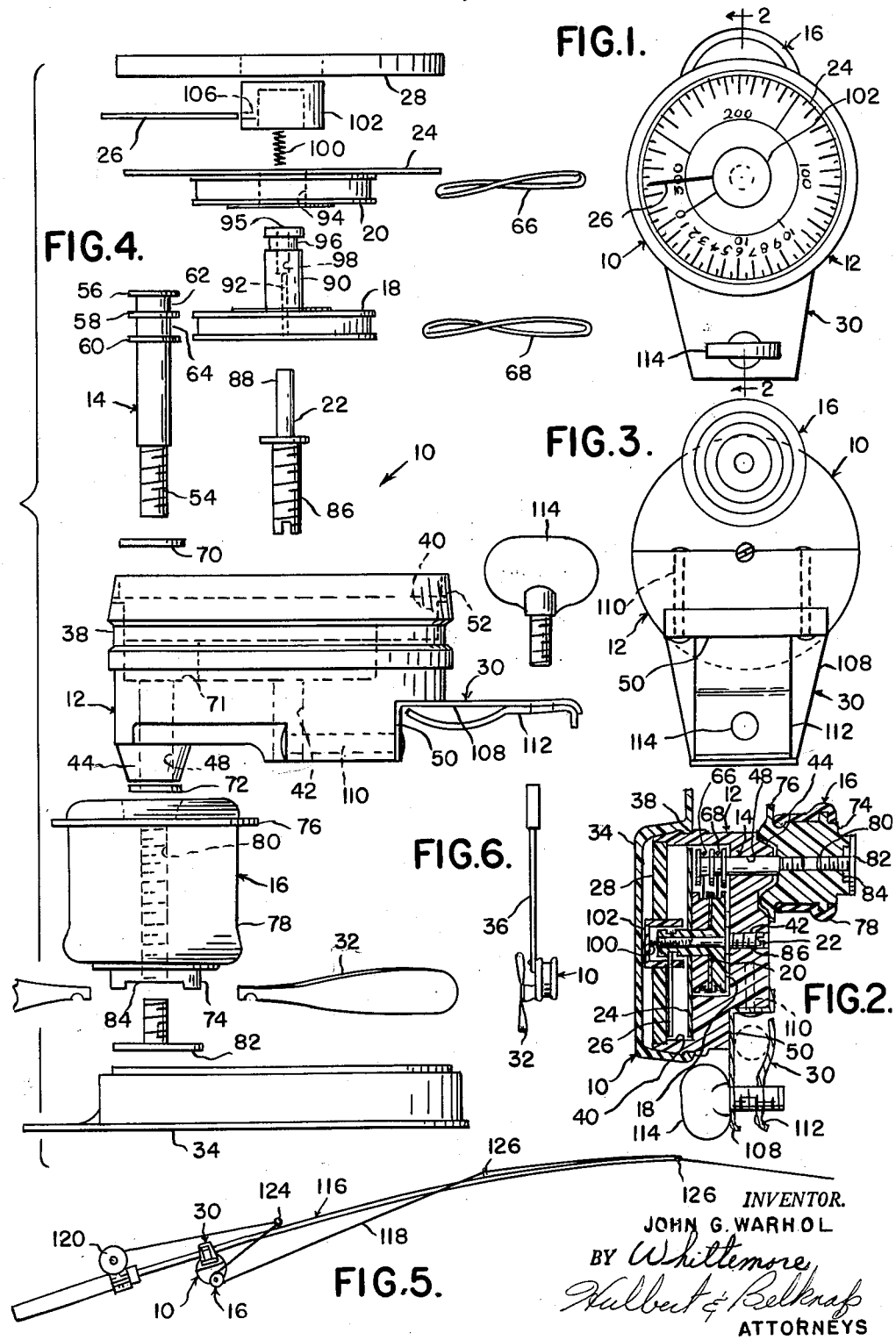

3,101,612
FISHING LINE LENGTH AND BOAT SPEED GAGE
John G. Warhol, 14041 Vernon, Oak Park 37, Mich.
Filed May 25, 1959, Ser. No. 815,456
10 Claims. (Cl. 73—187)

The present invention relates to a fisherman's bait gage and refers more particularly to a device for measuring the length of a fishing line or the like and the speed of a boat.

It is a well known fact that different types of fish at different times of the day and during different periods of the year are found at different water depths. It is therefore necessary to determine the length of fishing line being used in still or drift fishing to insure that the bait attached to the end thereof is positioned at a depth where fish are located.

Likewise in trolling for fish it is essential that the fish bait be drawn through the water at a depth where fish are located. However in trolling for fish the depth at which a particular bait will be drawn through the water will depend on both the length of line being used and the speed of the boat towing the bait relative to the water. In trolling the speed of the boat as well as the length of line used is important due to the different angles which the line forms with the boat at different speeds and because fish even during non-feeding hours will attack objects moving through the water at particular speeds more readily.

Also, it is advantageous to know the speed at which a boat has traveled when it is desired to return to a particular fishing spot at a later time. That is to say it is only necessary to know in what direction a boat has traveled and how long it has traveled in said direction to return to the spot from which it started if the speed at which the boat traveled is known. In general the direction of the boat can be determined with respect to prominent landmarks along the shore and the time determined by convenient means such as a watch so that it is only necessary to provide means to determine the speed of a boat to enable fishermen to return to a desired fishing spot with accuracy.

It is therefore one of the objects of the present invention to provide means for attachment to a fishing rod or the like to measure the length of line as it is unreeled for use.

Another object is to provide portable means to determine the speed of a boat through water.

More specifically it is an object to provide a device adapted to be attached to a fishing rod having a rotating wheel thereon around which the line on the rod is looped so that the wheel is rotated as the line is unreeled for use and including means operatively associated with said wheel to transpose the rotations of said wheel by a particular length of line into an indication of said particular length of line on a dial integral with said device.

More specifically it is an object to provide a portable device for aiding in the determination of the speed of a boat including a rotatable shaft, means mounted on one end of said shaft for rotating the shaft in accordance with the speed of said device through the water as the device is drawn through the water and means connected to the other end of said shaft to transpose said shaft rotations into a visual indication representative of the speed of a boat through water when said device is drawn through the water by said boat.

It is a further object of the present invention to provide a single device capable of measuring both the length of fish line as it is unreeled for use and the speed of a boat through the water so that fish bait may be towed through the water at the most advantageous speed and depth.

It is a further object of the present invention to provide a device for measuring the length of a fish line as it is unreeled for use or for measuring the speed of a boat which is economical, easy to manufacture and efficient in use, so that fishermen utilizing said device will be more equal in their fish catching ability.

These and other objects and features of the invention will become apparent as the description proceeds, especially when taken in conjunction with the accompanying drawings, illustrating preferred embodiments of the invention, wherein:

FIGURE 1 is a front elevation of the bait gage of the invention.

FIGURE 2 is a section through the bait gage illustrated in FIGURE 1 taken on the line 2—2 in FIGURE 1.

FIGURE 3 is a rear elevation of the bait gage of FIGURE 1.

FIGURE 4 is an exploded view of the bait gage of FIGURE 1 showing the relative relation of the parts thereof ready for assembly.

FIGURE 5 illustrates the bait gage of the invention in position on a fishing rod for measuring the amount of fishing line being used.

FIGURE 6 illustrates the bait gage attached to a handle and having a propeller secured thereto ready for use in the determination of the speed of a boat.

One embodiment of the bait gage of the invention will now be described with particular reference to the figures.

As best shown in FIGURES 1 and 2 the bait gage of the invention generally indicated 10 comprises a case 12, a drive shaft 14 extending through the bottom of case 12, a drive wheel 16 secured to the drive shaft 14 in driving relation thereto, a pair of pulleys 18 and 20 rotatable about a mounting stud 22, a dial 24 secured to pulley 20 for rotation therewith, a pointer 26 adapted to rotate with the pulley 18, a top plate 28 for case 12, and a mounting bracket 30 secured to case 12. Propeller halves 32, cover 34 and handle 36 are provided for use with the device of the invention when it is used in the determination of the speed of a boat through water. The bait gage 10 is operative when attached to a fishing rod as indicated in FIGURE 5 to measure the length of line unreeled therefrom and is operative in conjunction with the handle 36, cover 34 and propeller 32 as indicated to aid in the determination of the speed of a boat through water.

With specific reference to FIGURE 4 the structure of the bait gage will now be considered. The case 12 is shaped as shown in the form of a short recessed cylinder preferably made of molded plastic, such as nylon or vinyl plastic. An annular groove 38 is provided around the exterior surface of the case 12 for the purpose of fastening a cover 34 thereon to prevent water from leaking into the bait gage during use thereof in the determination of the speed of a boat as will later be explained. Case 12 is also provided with stepped recess 40 therein to receive the drive shaft 14, pulleys 18 and 20, top plate 28 and the mechanism associated therewith. A passage 42 is provided between the back of case 12 and the bottom of the stepped recess 40 and is threaded to provide means for securing mounting stud 22 inside of recess 40 and centrally of the case 12. Case 12 also has a boss 44 extending from the rear thereof as shown and a passage 48 extending through the boss 44 and the back of the case into the stepped recess 40 for rotatably mounting the drive shaft 14. A recess 50 is cut into the back of case 12 as shown to receive mounting bracket 30. Orifices 52 are provided through opposite sides of the case 12 near the front edge thereof to allow the removal from the recess 40 of the top plate 28 which is assembled with case 12 by means of a pressed fit in recess 40. Case 12 provides a housing for the operating and indicating mechanism of the bait gage of the invention.

Drive shaft 14 as illustrated in FIGURE 4 is an elongated cylindrical member having threads 54 on one end thereof and three equally spaced discs 56, 58 and 60 on the other end defining adjacent pulley means 62 and 64 located therebetween of equal diameter which in conjunction with drive belts 66 and 68 function to drive the dial 24 and pointer 26 on rotation of drive wheel 16 as will later be shown. The drive shaft 14 is rotatably received in the passage 48 through the case 12 with the disc 60 resting on a bearing disc 70 sleeved over the drive shaft and positioned between the disc 60 on the drive shaft and the lower horizontal surface 71 of the stepped recess 40. The threaded end 54 of the drive shaft 14 extends outwardly through boss 44 on case 12. A second bearing disc 72 is sleeved over the threaded end 54 of the drive shaft 14 and a drive wheel 16 is threadedly engaged with the drive shaft 14 as illustrated to hold the drive shaft in position within case 12 and to impart rotation thereto.

The drive wheel 16 has a core 74 which may also be made of molded plastic and which has a flange 76 around one end thereof as shown best in FIGURE 4 adapted to prevent line passing over the friction surface covering 78 and coming into contact with the drive shaft 14. The end of core 74 abutting boss 44 is slightly concave to receive boss 44 and bearing disc 72 as illustrated. The passage 80 extending through the core 74 of the drive wheel 16 is provided to receive the threaded end of drive shaft 14 at one end thereof and to threadedly receive the threaded bolt 82 at the other end thereof, the bolt 82 acts in conjunction with a recess 84 extending laterally across the passage 80 to fixedly mount propeller halves 32 on drive wheel 16 as will later be explained. The friction covering 78 may be a sleeve of any suitable material having a high coefficient of friction, such as rubber. The friction covering 78 must also be sufficiently pliable to fit over the drive wheel core 74 shaped as shown to prevent line looped thereover from slipping over the end thereof opposite the flange 76.

The mounting stud 22 is provided with threads 86 on one end thereof and is adapted to be threadedly secured in passage 42 within the case 12 with the end 88 thereof extending perpendicularly toward the front of case 12 centrally thereof within recess 40. Stud 22 is provided to rotatably mount the pulleys 18 and 20 as will be seen.

The pulley 18 as shown best in FIGURE 4 is provided with an axially extending cylindrical portion 90 having a passage 92 therethrough. The passage 92 is provided to rotatably mount the pulley 18 on the end 88 of stud 22 within the lower portion of the stepped recess 40. Pulley 20 as shown also in FIGURE 4 has secured to the upper side thereof a dial 24 for rotation therewith and is provided with a passage 94 therethrough adapted to fit over the cylinder 90 attached to and extending from the pulley 18.

In assembly then the pulley 18 fits over and rotates around the mounting stud 22 and the pulley 20 fits over and rotates around the shaft 90 of the pulley 18. The drive belts 66 and 68 which may be rubber bands extend between the pulley portion 64 of the drive shaft 14 and pulley 18 and between the pulley portion 62 of the drive shaft 14 and the pulley 20 respectively, so that as the drive shaft 14 is rotated by the drive wheel 16 the pulleys 18 and 20 are separately rotated.

The end 95 of the shaft 90 extending through the pulley 20 and the dial 24 is provided with an annular groove 96 therearound and the passage 92 is provided with a recessed portion 98 at the end 95 of shaft 90. The spring 100 is adapted to fit within the recessed portion 98 of the passage 92 to bias cap 102 placed over the end 95 of the shaft 90 in a direction away from shaft 90. Pointer 26 extends through an orifice 106 in cap 102 and into the groove 96 to hold the cap 102 on the end 95 of the shaft 90 in opposition to spring 100 in the assembled bait gage.

With the spring 100 biasing the pointer 26 against the upper surface of groove 96 the pointer 26 is held in a fixed position with respect to the shaft 90 and therefore rotates with the pulley 18. By depressing cap 102 on pressing down slightly thereon to allow pointer 26 to assume a position between the upper and lower surfaces of groove 96 the pointer 26 may be freed with respect to the shaft 90 and may be positioned as desired in groove 96 with respect to dial 24 by merely rotating the cap 102. The purpose of this adjustment of pointer 26 will later become evident.

The surface of the dial 24 as best shown in FIGURE 1 is divided by radial indications into ten degree segments around the outer periphery thereof and is divided radially inwardly thereof into segments marked 10, 100 and 200 corresponding to one hundred degrees each and a fourth segment corresponding to sixty degrees starting in a clockwise direction from a reference point indicated as zero degrees. The first ten, ten degree indications in series are numbered from 1 to 10 as shown and the one hundred degrees segment below the first ten, ten degree segments is marked 10 indicating that each of the marks around the outer periphery of the dial 24 should be multiplied by ten to determine the proper number of degrees or as will later be seen the proper number of linear feet of line measured by the bait gage. The next ten, ten degree indications are again marked 1 through 10 and have below them the mark 100 indicating that the number of degrees from the zero reference point to the particular mark is one hundred degrees plus ten times the number of degrees associated with the degree indication which will be again the number of feet of line which the bait gage has measured. In a similar manner the next ten ten degree indications are again numbered from 1 to 10 and have below them an indication of 200 and the last six ten degree indications have written below them 300 indicating therefore that the total number of feet of line which can be measured by the bait gage illustrated is 360 feet at which time the bait gage will start measuring again from a zero reference.

The principle of operation of the bait gage of the invention lies in making the pulleys 18 and 20 of slightly different circumference so that as pulleys 18 and 20 rotate independently driven by the same drive shaft 14 by means of belts 66 and 68 the pointer 26 will move at a different rate of speed than the dial 24. With the pulley 18 being of different diameter than the pulley 20 it will be seen that the pointer 26 will move slightly with respect to a particular position on the dial 24 with each rotation of the drive shaft 14. The movement of the pointer 26 with respect to the dial 24 will be the same with each rotation of the drive shaft 14 and with the diameter of pulley 18 properly selected with respect to the diameter of pulley 20 the rotation of the drive wheel 16 by a length of line equal to one foot passing therearound can be made to produce a one degree difference in rotation of the dial 24 with respect to the pointer 26.

Thus to measure the length of a line with the bait gage described it is necessary to draw the line to be measured over the drive wheel 16 in a manner to frictionally engage the friction cover 78 to cause rotation of the drive wheel 16 and to read from the dial directly the number of feet of line causing rotation of the drive wheel 16 to produce relative angular movement of the pointer and dial as indicated. After reading the length of line measured on the dial 24 it is necessary to reset the pointer to zero before another measurement is made. Thus the cap 102 is pressed downward against the bias of spring 100 and rotated to bring the pointer 26 to the zero mark on the dial 24 as previously indicated.

The top plate 28 as shown best in FIGURES 2 and 4 is provided to close the top of case 12 and to prevent an undue amount of dirt and other foreign matter from collecting in the dial case on the mechanism of the bait gage. The top plate 28 is a pressed fit in the recess 40 in case 12. Therefore orifices 52 are provided on opposite sides of the case 12 to permit the insertion therethrough of a relatively thin small object when it is desired to remove the top plate 28 from the case 12. Top plate 28 is of course made of a clear material such as clear plastic or glass to permit ready reading of the dial 24.

Mounting bracket 30 comprises three parts, a bracket 108 secured to the case 12 as shown by rivets 110, a clamp member 112 adapted to be clamped to the bracket 108 to secure the bait gage to a fishing rod or the like and wing nut 114 for securing the bracket 108 and clamp 112 together when the bait gage is used on a fishing rod and for securing the handle 36 to the bait gage when it is used in the determination of the speed of a boat through water.

As previously mentioned when it is desired to use the bait gage to determine the speed of a boat through water it is necessary to position the propeller halves 32 as shown in FIGURE 4 in the recess 84 on drive wheel 16 and secure them therein by means of a bolt 82. With the handle 36 attached to the bait gage 10 by means of wing nut 114, the propeller attached to drive wheel 16, and the cover 34 placed over the case 12, the bait gage may be immersed in the water alongside of a moving boat whereupon the propeller will be turned by the flow of water therepast to cause rotation of the drive shaft 14 and consequent relative rotation of the pointer 26 with respect to the dial 24. The indication appearing on the bait gage 10 due to the relative rotation of the pointer 26 with respect to the dial 24 will again be an indication in degress or linear feet and may be read after a predetermined period of for example fifteen seconds during which the bait gage is immersed. Subsequently, by means of proper conversion factors which may be printed on the bait gage handle converting from degree readings to miles per hour for a fifteen second immersion, the speed of the bait gage through the water may be determined. The speed of the bait gage through the water will be the speed of the boat drawing the bait gage through the water providing the bait gage is held substantially perpendicular to the surface of the water with the axis of the drive shaft in line with the direction of travel of the boat.

In operation the bait gage 10 as described above may be attached to a fishing rod generally indicated 116 as shown in FIGURE 5 by means of mounting bracket 30 with the line 118 on the reel 120 carried by rod 116 passed through the first eyelet 124 of the rod 116 and looped over the drive wheel 16 of the bait gage 10 and subsequently passed through the remaining eyelets 126 of the rod 116. Alternatively the bait gage 10 as described above with the propeller halves 32 in position on drive wheel 16 is attached to handle 36 provided therefor as shown in FIGURE 6. The drive wheel 16 is then caused to rotate either by drawing the bait gage 10 with the propeller halves 32 attached thereto through water or by drawing line from the reel through eyelet 124 over the drive wheel 16 and through the eyelets 126. Rotation of the drive wheel 16 will impart rotation to the drive shaft 14 as previously indicated which rotation is transferred to the differently sized pulleys 18 and 20 by means of the drive belts 68 and 66 respectively to cause relative angular movement between the dial 24 and the pointer 26 as previously described. The angular differences between the rotation of the pointer 26 and the dial 24 as read from the dial 24 will then be a measurement of the linear feet of line passed around the bait gage drive wheel 16 or may be used in conjunction with a conversion scale on the handle of the bait gage to determine the speed of a boat providing the bait gage has been drawn through the water by the boat for a length of time corresponding to the time used in computation of the conversion factors between the degrees of relative rotation between the pointer and dial and miles per hour. In a practical embodiment of the invention conversion factors have been used requiring a fifteen second conversion of the bait gage.

Thus applicant has provided a bait gage to enable the average fisherman while still or drift fishing to determine the length of line which he is using in order that he may maintain his bait at the most desirable depth for catching fish at a particular time of day during a specific season. Furthermore applicant's bait gage since it can also be used in the determination of the speed through the water of a fishing boat can be used in conjunction with proper conversion factors to determine the length of fishing line which it is necessary to use while trolling at a particular speed to maintain a fish bait at a desired depth and can also be used so that the speed of a boat may be regulated to the speed at which particular fish are antagonized. Likewise applicant's bait gage may be used to determine the speed of a boat so that in conjunction with knowledge of the time of travel and the direction of travel it will be possible for a fisherman to return to a desired fishing spot after once leaving the spot.

What I claim as my invention is:

1. A measuring device comprising a drive shaft, a drive wheel operatively associated with said drive shaft and a propeller attached to said drive wheel for producing rotation of said drive shaft of a predetermined amount representative of the magnitude of a quantity to be measured, a pair of other coaxial rotatable means, resilient means directly connecting said other rotatable means and said drive shaft for transferring rotation of said drive shaft into relative angular movement between said other rotatable means, and means attached to said other rotatable means for indicating the quantity to be measured as a function of said relative angular movement therebetween.

2. A measuring device comprising a drive shaft, a drive wheel operatively associated with said drive shaft for producing rotation of said drive shaft of a predetermined amount relative to the magnitude of a quantity to be measured, a pair of rotatably mounted coaxial pulleys having different diameters, a separate resilient drive belt acting between each of said pulleys and said drive shaft for transferring rotation of said drive shaft into relative angular movement between said pulleys, and means attached to said pulleys for indicating the quantity to be measured as a function of said relative angular movement therebetween.

3. The construction as set forth in claim 2 wherein each drive belt is a rubber band.

4. A measuring device comprising a drive shaft, a drive wheel operatively associated with said drive shaft for producing rotation of said drive shaft of a predetermined amount relative to the magnitude of a quantity to be measured, a pair of rotatably mounted coaxial pulleys having different diameters, an elastic drive belt acting between each of said pulleys and said drive shaft for transferring rotation of said drive shaft into relative angular movement between said pulleys, a dial having angular indications on the face thereof attached to one of said pulleys, and a pointer attached to the other of said pulleys, said dial and pointer being operatively associated to indicate the quantity to be measured as a function of said relative angular movement between said pulleys.

5. The construction as set forth in claim 4 wherein said dial has a zero angular indication thereon and means are provided for setting said pointer at said zero angular indication, including a spring biased cap in which said pointer is secured, a support for said cap attached to said other pulley extending perpendicularly and axially thereof, said support having an annular groove around the outer end thereof operable to receive the inner end of said pointer, said pointer being rotatable angularly into registration with the zero indication on said dial on depression of said cap in opposition to said spring and rotation of the cap angularly about the outer end of said support.

6. The construction as set forth in claim 4 wherein said drive wheel comprises a relatively rigid cylindrical core secured to one end of said drive shaft for rotation therewith, said core having an annular flange at each end thereof, and a friction sleeve surrounding said core and the flange closest said one end of said drive shaft.

7. A measuring device adapted to be attached to a fishing rod for measuring the length of line passing the device, comprising a cylindrical case having a recess in one end thereof, stud means for rotatably mounting a pair of pulleys within said recess extending into said recess from the other end of said case, a pair of coaxial pulleys mounted for rotation within said recess on said stud means, said pulleys being of different diameter, a drive shaft extending into said recess alongside of said pulleys through said other end of said case, means exterior of said case and secured to said drive shaft for imparting rotary motion to said drive shaft in an amount proportional to the length of line passing the device, elastic bands connecting said pulleys to said drive shaft whereby relative angular movement between said pulleys is produced on rotation of said drive shaft which is proportional to the length of line passing the device, a dial secured to one of said pulleys for rotation therewith, a pointer secured to the other of said pulleys for rotation therewith, said dial and pointer being so related as to indicate the length of line passing the device on relative angular movement of said pulleys, a transparent top plate positioned over said recess in said case and means for securing said case to a fishing rod.

8. The construction as set forth in claim 7 wherein said other of said pulleys includes an elongated sleeve coaxial therewith and surrounding said stud means and said one of said pulleys is rotatably mounted on said sleeve.

9. The construction as set forth in claim 4 and further including a propeller secured to said drive wheel for producing rotation thereof on immersion of the device in water moving relative to the device.

10. A measuring device comprising a single first rotatable means, means operatively associated with said first rotatable means for producing rotation of said first rotatable means of a predetermined amount representative of the magnitude of a quantity to be measured, two other coaxial rotatable means, said other coaxial rotatable means comprising pulleys of different diameter, resilient means acting between said other rotatable means and said first rotatable means for transferring rotation of said first rotatable means into relative angular movement between said other rotatable means of a magnitude proportional to the degree of rotation of said first rotatable means, and means attached to said other rotatable means for indicating the quantity to be measured as a function of said relative angular movement therebetween.

References Cited in the file of this patent

UNITED STATES PATENTS

| 188,738 | Heckert | Mar. 27, 1877 |
| 711,521 | Parmellee | Oct. 21, 1902 |
| 902,337 | Sipp | Oct. 27, 1908 |
| 2,115,822 | Menschner | May 3, 1938 |
| 2,752,686 | Anderson et al. | July 3, 1956 |
| 2,773,383 | Kersten | Dec. 11, 1956 |

FOREIGN PATENTS

| 23,537 | Switzerland | Apr. 24, 1901 |